United States Patent
Gekht et al.

(10) Patent No.: US 9,366,138 B2
(45) Date of Patent: Jun. 14, 2016

(54) ROTARY INTERNAL COMBUSTION ENGINE WITH PHASING GEAR

(75) Inventors: Eugene Gekht, Brossard (CA); Sebastien Bolduc, Longueuil (CA); Mike Fontaine, Boucherville (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 475 days.

(21) Appl. No.: 13/273,479

(22) Filed: Oct. 14, 2011

(65) Prior Publication Data
US 2013/0028774 A1    Jan. 31, 2013

Related U.S. Application Data

(60) Provisional application No. 61/512,462, filed on Jul. 28, 2011.

(51) Int. Cl.
| | |
|---|---|
| *F02B 55/02* | (2006.01) |
| *F02B 53/00* | (2006.01) |
| *F01C 19/10* | (2006.01) |
| *F01C 21/08* | (2006.01) |
| *F02B 53/02* | (2006.01) |

(Continued)

(52) U.S. Cl.
CPC . *F01C 21/08* (2013.01); *F01C 1/22* (2013.01); *F01C 17/02* (2013.01); *F01C 19/10* (2013.01); *F01L 7/16* (2013.01); *F02B 1/04* (2013.01); *F02B 53/00* (2013.01); *F02B 53/02* (2013.01); *F01C 19/005* (2013.01); *F01C 19/08* (2013.01); *F02B 2053/005* (2013.01); *F02B 2075/027* (2013.01); *Y02T 10/17* (2013.01); *Y10T 29/49234* (2015.01)

(58) Field of Classification Search
CPC .... F02B 2053/005; F02B 53/00; F02B 53/02; F02B 2075/027; F02B 1/04; Y02T 10/17; F01C 1/22; F01C 19/10; F01L 7/16
USPC ......... 123/200; 418/61.2, 122, 119, 121, 142, 418/94, 61.1; 29/888.012; 184/27.2; 277/357, 379, 396, 399; 74/433
See application file for complete search history.

(56) References Cited

U.S. PATENT DOCUMENTS

| | | | |
|---|---|---|---|
| 2,979,042 | A | 4/1961 | Bentele |
| 3,033,180 | A | 5/1962 | Bentele |

(Continued)

FOREIGN PATENT DOCUMENTS

| | | | | |
|---|---|---|---|---|
| DE | 3509208 A1 | * | 9/1985 | ............... F04C 18/22 |
| EP | 2497902 | | 9/2012 | |
| JP | 61200305 A | * | 9/1986 | ................ F01C 1/22 |

OTHER PUBLICATIONS

English Language Machine Translation of DE3509208.*

*Primary Examiner* — Thai Ba Trieu
*Assistant Examiner* — Wesley Harris
(74) *Attorney, Agent, or Firm* — Norton Rose Fulbright Canada

(57) ABSTRACT

In one aspect, described is a rotor of a rotary internal combustion engine, including a phasing gear with an annular meshing section including a plurality of radially inwardly oriented teeth and an annular attachment section connected to the meshing section and coaxial therewith, the attachment section being offset axially inwardly from the teeth and having at least a portion thereof located radially inwardly of the teeth, and a fastener apparatus connecting the phasing gear to the rotor body, the fastener apparatus engaging the rotor body radially inwardly of the teeth.

18 Claims, 3 Drawing Sheets

(51) Int. Cl.
  F01L 7/16 (2006.01)
  F02B 1/04 (2006.01)
  F01C 1/22 (2006.01)
  F01C 17/02 (2006.01)
  F02B 75/02 (2006.01)
  F01C 19/00 (2006.01)
  F01C 19/08 (2006.01)

(56) References Cited

U.S. PATENT DOCUMENTS

| | | | | |
|---|---|---|---|---|
| 3,042,009 A | * | 7/1962 | Froede et al. | 418/94 |
| 3,059,937 A | | 10/1962 | Wettstein | |
| 3,102,518 A | | 9/1963 | Anderson | |
| 3,102,520 A | | 9/1963 | Schlör | |
| 3,134,337 A | | 5/1964 | Paschke | |
| 3,134,537 A | | 5/1964 | Bentele et al. | |
| 3,134,600 A | | 5/1964 | Fisch | |
| 3,139,233 A | | 6/1964 | Simonsen | |
| 3,142,439 A | | 7/1964 | Froede | |
| 3,142,440 A | * | 7/1964 | Schagg | 418/61.2 |
| 3,171,590 A | * | 3/1965 | Bentele et al. | 418/61.2 |
| 3,180,562 A | | 4/1965 | Bentele | |
| 3,196,849 A | | 7/1965 | Paschke | |
| 3,246,636 A | | 4/1966 | Bentele | |
| 3,261,542 A | | 7/1966 | Jones | |
| 3,300,127 A | | 1/1967 | Yamamoto et al. | |
| 3,323,712 A | | 6/1967 | Froede et al. | |
| 3,400,604 A | * | 9/1968 | Jones | 74/433 |
| 3,535,061 A | | 10/1970 | Yamamoto | |
| 3,575,541 A | | 4/1971 | Hamada | |
| 3,656,764 A | | 4/1972 | Robinson | |
| 3,801,240 A | | 4/1974 | Ruf | |
| 3,802,810 A | * | 4/1974 | Reitz et al. | 418/61.2 |
| 3,849,037 A | | 11/1974 | Downs | |
| 3,853,440 A | | 12/1974 | Green | |
| 3,875,634 A | | 4/1975 | Minegishi | |
| 3,890,937 A | | 6/1975 | Koivunen | |
| 3,891,357 A | | 6/1975 | Davis et al. | |
| 3,899,272 A | | 8/1975 | Pratt | |
| 3,907,464 A | * | 9/1975 | Mitchell | 418/61.2 |
| 3,924,979 A | | 12/1975 | Rose | |
| 3,930,767 A | | 1/1976 | Hart | |
| 3,932,075 A | | 1/1976 | Jones | |
| 3,941,523 A | | 3/1976 | Shin et al. | |
| 3,969,049 A | | 7/1976 | Hermes et al. | |
| 3,976,406 A | | 8/1976 | Sasaki | |
| 3,981,642 A | | 9/1976 | Kawamura et al. | |
| 4,028,022 A | | 6/1977 | Takeuchi et al. | |
| 4,047,856 A | | 9/1977 | Hoffman | |
| 4,058,321 A | | 11/1977 | Gavrun et al. | |
| 4,060,352 A | | 11/1977 | Woodier et al. | |
| 4,102,617 A | | 7/1978 | Kato | |
| 4,176,848 A | | 12/1979 | Lafuze | |
| 4,225,294 A | | 9/1980 | Kakuwa et al. | |
| 4,382,755 A | * | 5/1983 | Hoffmann | 418/61.2 |
| 4,466,621 A | | 8/1984 | Garner et al. | |
| 4,772,189 A | * | 9/1988 | Garside | 418/61.2 |
| 6,186,510 B1 | | 2/2001 | Reagan | |
| 2004/0164496 A1 | | 8/2004 | Okada et al. | |
| 2012/0227397 A1 | | 9/2012 | Willi et al. | |
| 2013/0028773 A1 | | 1/2013 | Gekht et al. | |

* cited by examiner

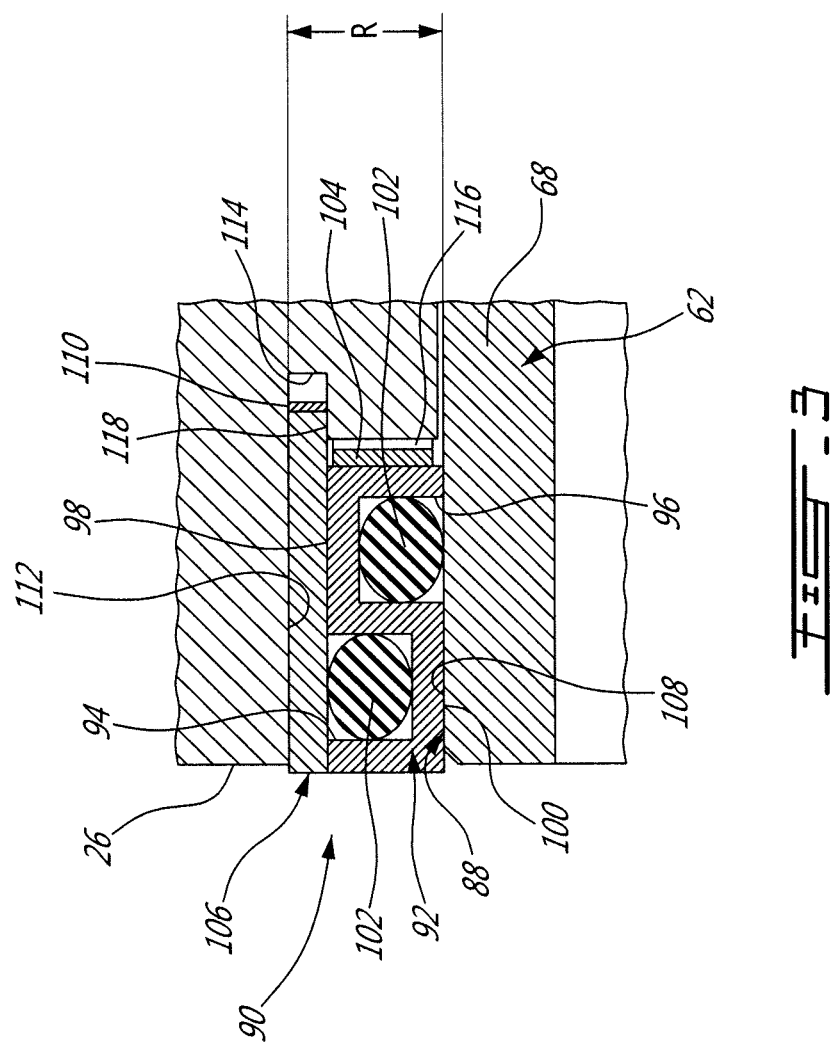

ROTARY INTERNAL COMBUSTION ENGINE WITH PHASING GEAR

CROSS-REFERENCE TO RELATED APPLICATION

This application claims priority on provisional U.S. application No. 61/512,462 filed Jul. 28, 2011, the entire contents of which are incorporated by reference herein.

TECHNICAL FIELD

The application relates generally to an internal combustion engine using a rotary design to convert pressure into a rotating motion, more particularly, to a rotor phasing gear for such an engine.

BACKGROUND OF THE ART

Rotary engines such as the ones known as Wankel engines use the eccentric rotation of a piston to convert pressure into a rotating motion, instead of using reciprocating pistons. In these engines, the rotor includes a number of apex portions which remain in contact with a peripheral wall of the rotor cavity of the engine throughout the rotational motion of the rotor.

The eccentric rotary motion of the rotor is guided through a rotor phasing gear which is meshed with a stator phasing gear. The rotor phasing gear is typically made of a different material than a remainder of the body of the rotor, and as such is usually manufactured separately therefrom. It is known to attach the phasing gear to the rotor body through fasteners located on the outer diameter of the phasing gear.

SUMMARY

In one aspect, there is provided a rotor of a rotary internal combustion engine, the rotor comprising a body having two axially spaced apart end faces and a peripheral face extending between the end faces, the peripheral face defining three circumferentially spaced apex portions, the body having a central bore for receiving an eccentric portion of a shaft therein, a phasing gear received in a complementary annular gear groove defined in one of the end faces around and in proximity of the central bore, the phasing gear having an annular meshing section coaxial with the central bore and including a plurality of radially inwardly oriented teeth regularly distributed about a circumference thereof, and an annular attachment section connected to the meshing section and coaxial therewith, the attachment section being offset axially inwardly from the teeth and having at least a portion thereof located radially inwardly of the teeth, and a plurality of fasteners connecting the phasing gear to the rotor body, the fasteners extending through the attachment section and into the rotor body and being located radially inwardly of the teeth.

In another aspect, there is provided a rotary internal combustion engine comprising a stator body having an internal cavity defined by two axially spaced apart end walls and a peripheral wall extending between the end walls, the cavity having an epitrochoid shape defining two lobes, a rotor body having two axially spaced apart end faces each extending in proximity of a respective one of the end walls of the stator body, and a peripheral face extending between the end faces and defining three circumferentially spaced apex portions, the rotor body having a central bore engaged to an eccentric portion of a shaft to rotate within the cavity with each of the apex portions remaining adjacent the peripheral wall, a stator phasing gear attached to the stator body and coaxial with the shaft and having a plurality of radially outwardly oriented teeth regularly distributed about a circumference thereof, a rotor phasing gear received in a complementary annular gear groove defined in one of the end faces around and in proximity of the central bore, the rotor phasing gear having an annular meshing section coaxial with the central bore and including a plurality of radially inwardly oriented teeth in meshed engagement with the teeth of the stator phasing gear, and an annular attachment section connected to the meshing section and coaxial therewith, the attachment section being offset axially inwardly from the stator phasing gear and from the teeth of the rotor phasing gear and having at least a portion thereof extending radially inwardly of the teeth, and a plurality of fasteners connecting the rotor phasing gear to the rotor body, the fasteners extending through the attachment section and into the rotor body and being located radially inwardly of the teeth.

In a further aspect, there is provided a method of guiding a motion of a rotor of a Wankel engine within a stator body of the engine, the method comprising securing a first phasing gear along a first annular section of the rotor coaxially with an eccentric portion of a rotor shaft of the engine, securing a second phasing gear to the stator body such that the second phasing gear is coaxial with the rotor shaft, and meshing the first phasing gear with the second phasing gear along a circumference of the first phasing gear aligned with a second annular section of the rotor, the second annular section being defined radially outwardly of the first annular section.

DESCRIPTION OF THE DRAWINGS

Reference is now made to the accompanying figures in which:

FIG. 3 is a schematic enlarged view of an oil seal assembly shown in FIG. 2.

DETAILED DESCRIPTION

Figure 1:
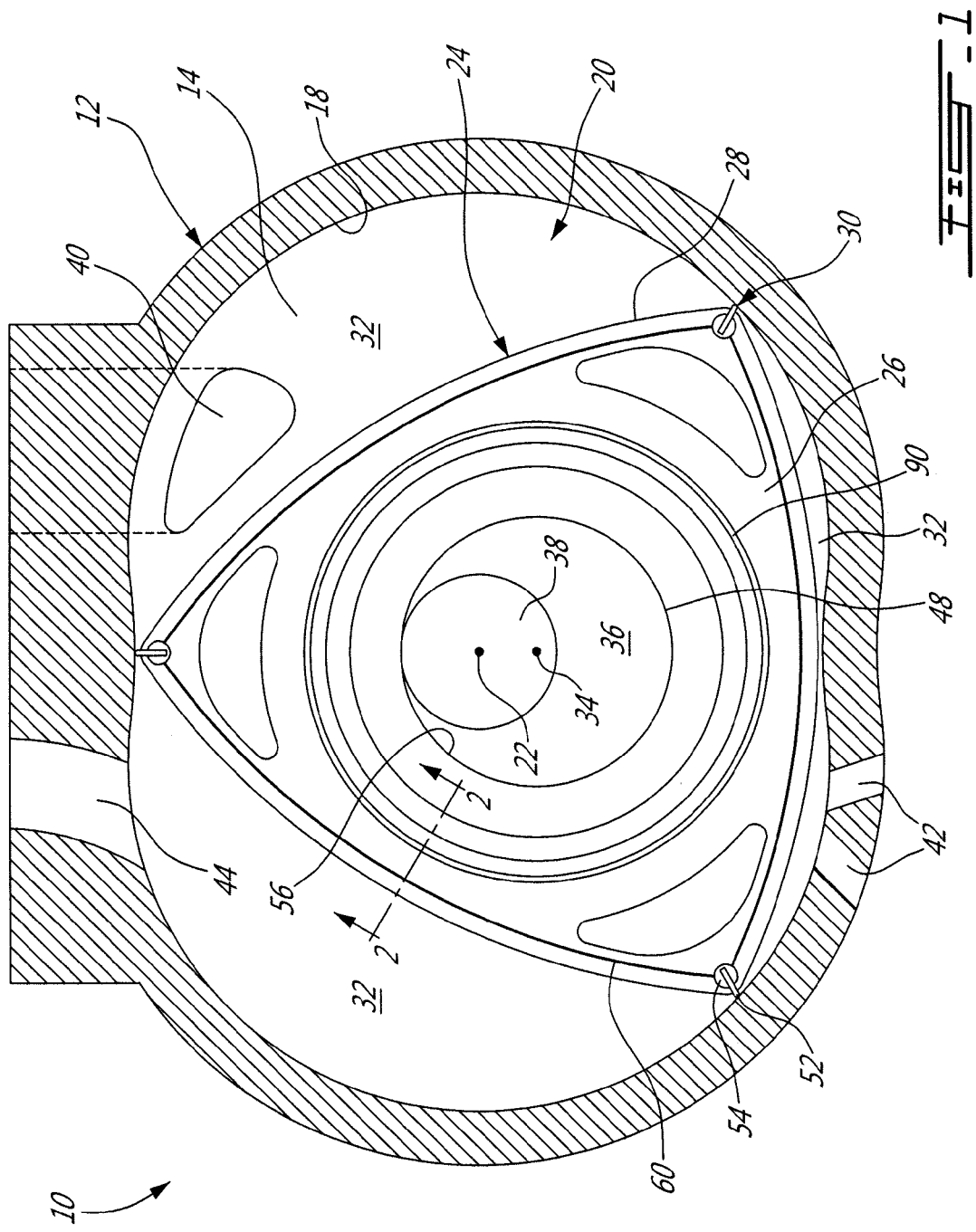
FIG. 1 is a schematic cross-sectional view of a rotary internal combustion engine in accordance with a particular embodiment.

Referring to FIG. 1, a rotary internal combustion engine 10 known as a Wankel engine is schematically shown. The engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides. The apex portions 30 are in sealing engagement with the inner surface of peripheral wall 18 to form three working chambers 32 between the inner rotor 24 and outer body 12. The geometrical axis 34 of the rotor 24 is offset from and parallel to the axis 22 of the outer body 12.

In the embodiment shown, the outer body 12 is stationary while the rotor 24 is journaled on an eccentric portion 36 of a shaft 38, the shaft 38 being co-axial with the geometrical axis 22 of the cavity 20. Upon rotation of the rotor 24 relative to the outer body 12 the working chambers 32 vary in volume. An intake port 40 is provided through one of the end walls 14 for admitting air, or air and fuel, into one of the working chambers 32. Passages 42 for a spark plug or other ignition mechanism, as well as for one or more fuel injectors (not shown) are provided through the peripheral wall 18. An exhaust port 44 is also provided through the peripheral wall 18 for discharge of the exhaust gases from the working chambers 32. Alternately, the exhaust port 44 and/or the passages 42 may be provided through the end wall 14, and/or the intake port 40 may be provided through the peripheral wall 18.

During engine operation the working chambers 32 have a cycle of operation including the four phases of intake, compression, expansion and exhaust, these phases being similar to the strokes in a reciprocating-type internal combustion engine having a four-stroke cycle.

For efficient engine operation the working chambers 32 are sealed by apex seals, face seals and end seals.

Each rotor apex portion 30 has a groove defined therein and extending radially inwardly into the rotor body 24, from one end face 26 to the other. An apex seal 52 is received within each groove, and protrudes radially from the peripheral face 28. In a particular embodiment, each apex seal 52 extends axially beyond both end faces 26, and has an axial dimension which is as close as possible to a distance between the two end walls 14 of the cavity 20, taking into consideration the difference in thermal expansion between the material(s) of the outer body 12 and the material of the apex seal 52, which in a particular embodiment is made of a suitable type of ceramic. In the embodiment shown in FIG. 2, each apex seal 52 is monolithic, i.e. is formed of a single seal member. Alternately, each apex seal 52 may be formed of two or more cooperating seal members. More than one apex seal 52 may also be provided on each apex portion 30. Each apex seal 52 is biased radially outwardly against the peripheral wall 18 through a respective spring (not shown).

An end seal 54 is received within a respective cylindrical recess (not shown) defined at each end of the groove. Each end seal 54 has a radial slot defined therein, which receives the respective end of the apex seal 52. Each end seal 54 is biased against the respective end wall 14 through a suitable spring (not shown).

Each end face 26 of the rotor 24 has at least one groove 58 (see FIG. 2) defined therein running from each apex portion 30 to each adjacent apex portion 30, with a face seal 60 being received within each groove 58. In a particular embodiment, each face seal 60 is monolithic. Each face seal groove 58 and corresponding face seal 60 are arc-shaped and disposed adjacent to but inwardly of the rotor periphery throughout their length. A spring (not shown) located behind each face seal 60 urges it axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof, for example by being received in a corresponding groove (not shown) defined in the end seal 54, or through abutment therewith. The end seals 54, face seals 60 and apex seals 52 thus cooperate to form a seal against the respective end wall 14.

Figure 2:
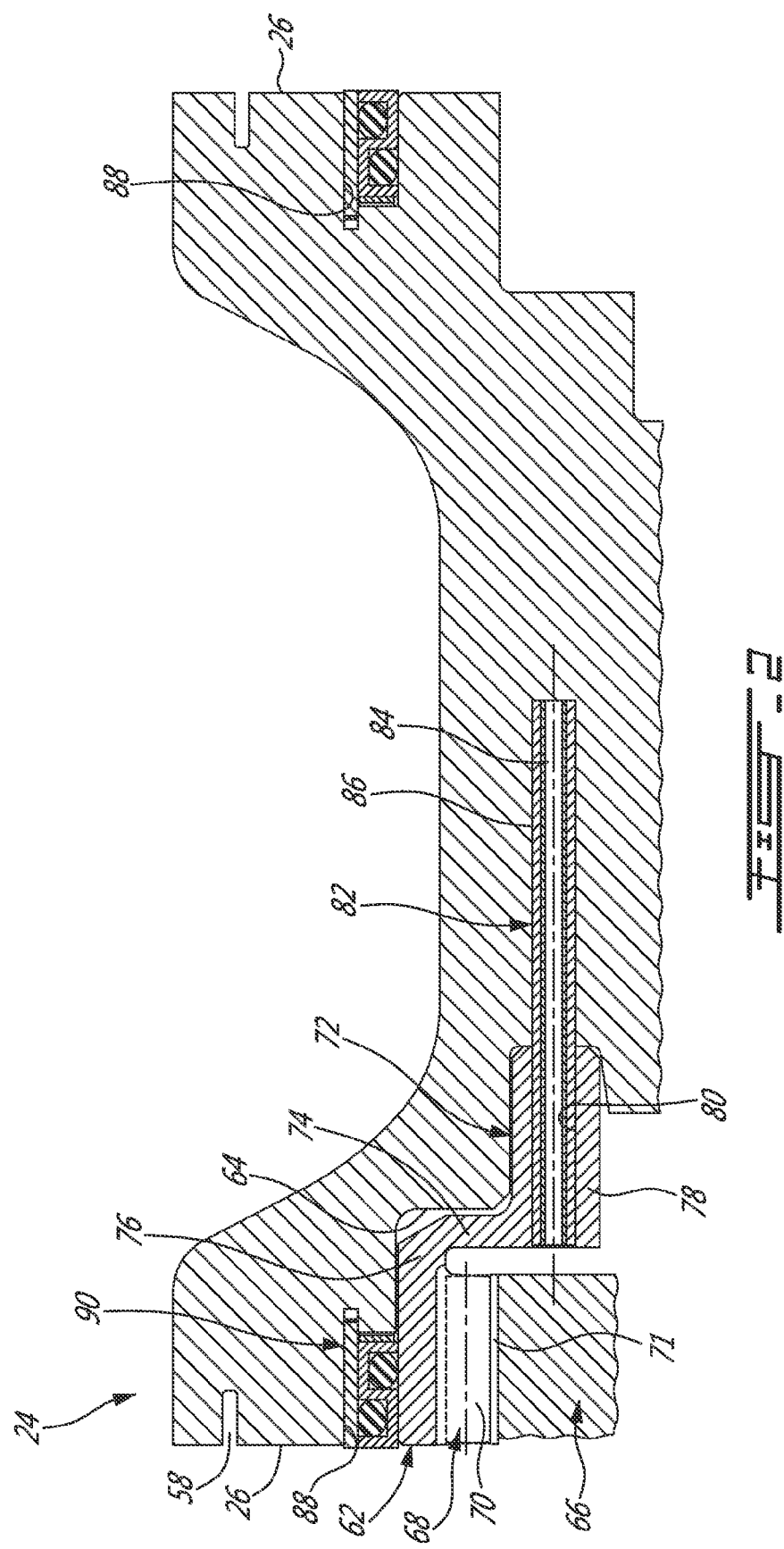
FIG. 2 is a schematic cross-sectional view taken along line 2-2 of FIG. 1.

Referring to FIG. 2, the rotor 24 includes a phasing gear 62 which is received in a complementary annular phasing gear groove 64 defined in one of the end faces 26. The phasing gear groove 64 is defined around and in proximity of the rotor's central bore 56 (see FIG. 1) which receives the eccentric portion 36 of the shaft 38. The rotor phasing gear 62 is secured in the gear groove 64 co-axially with the rotor axis 34, or in other words, with the central bore 56. The rotor phasing gear 62 is meshed with a fixed stator phasing gear 66 secured to the outer body 12 co-axially with the shaft 38, in order to maintain the relative motion of the inner rotor 24 relative to the stationary outer body 12.

The rotor phasing gear 62 includes an annular meshing section 68 coaxial with the rotor axis 34, which includes a plurality of radially inwardly oriented teeth 70 regularly distributed about a circumference thereof. The axially outer surface of the teeth 70 is in alignment or substantially in alignment with the portion of the end face 26 located radially outwardly of the phasing gear 62.

The rotor phasing gear 62 also includes an annular attachment section 72 which is connected to the meshing section 68 and coaxial therewith. The attachment section 72 is axially inwardly offset from the teeth 70 such as to leave sufficient room for the radially outwardly oriented teeth 71 of the stator phasing gear 66 to mesh with the teeth 70.

The attachment section 72 includes a radial portion 74 extending radially inwardly from an axially inner end 76 of the meshing section 68 and an axial portion 78 extending axially inwardly from the radial portion 74, creating a substantially Z-shaped cross-section for the phasing gear 62. The axial portion 78 includes a plurality of axially extending and circumferentially spaced apart fastener bores 80 defined therethrough (only one of which is shown). Each bore 80 receives a fastener 82 therein, with the fasteners extending axially inwardly beyond the phasing gear 62 and into the body of the rotor 24 to a depth sufficient to adequately connect the phasing gear 62 to the rotor body 24.

The axial portion 78 is defined such that the bores 80 and as such the fasteners 82 received therein are located radially inwardly of the teeth 70. The teeth 70 and fasteners 82 are thus aligned with two different annular sections of the rotor body 24, with the section aligned with the fasteners 82 being defined radially inwardly of the section aligned with the teeth 70. In the embodiment shown, the entire axial portion 78 is located radially inwardly of the teeth 70.

In the embodiment shown, the fasteners 82 are split rivets which include an inner pin 84 press-fitted into the central bore of a hollow outer pin 86 to press-fit the rivet into the fastener bore 80. Alternately, other adequate type of fasteners can be used, such as for example bolts, blind rivets, solid and hollow rivets, etc.

The configuration of the rotor phasing gear 62 may advantageously allow for the radial size of the gear 62 to be minimized for a given diameter of the teeth 70, by eliminating the annular outer portion which would otherwise be required for an attachment along the outer diameter. As such, the same phasing gear 62 may be used with rotors having a smaller rotor face profile. The smaller phasing gear 62 may also allow for larger oil seals to be used with smaller rotors. The smaller phasing gear 62 may also leave more room for the combustion area for a given rotor, when compared to the same rotor using a phasing gear attached along its outer diameter, since the location of the fasteners usually define an inner limit for the combustion area Referring to FIGS. 2-3, each end face 26 includes an annular oil seal groove 88 defined therein around the central bore and located radially inwardly of the face seal grooves 58. An annular oil seal assembly 90 is snugly received within each oil seal groove 88. Each oil seal assembly 90 prevents leakage flow of the lubricating oil radially outwardly thereof between the respective rotor end face 26 and outer body end wall 14.

As can be seen more clearly in FIG. 3, each oil seal assembly 90 includes an inner seal ring 92 protruding axially from the end face 26 and biased away from the end face by a spring member 104 which is received in the oil seal groove 88 axially inwardly of the seal ring 92. The seal ring 92 has axially spaced apart first and second circumferential slots 94, 96 defined therein. The first slot 94 opens in the radially outer surface 98 of the inner seal ring 92 while the second slot 96 opens in the radially inner surface 100 of the seal ring 92, thus defining a substantially S-shaped cross-section for the seal ring 92. In the embodiment shown, the first slot 94 is located axially outwardly of the second slot 96, and the slots 94, 96 have a rectangular cross-section. The inner seal ring 92 extends in contact with the radially inner surface 108 of the oil seal groove 88, which in the embodiment shown in defined by the radially outer surface of the meshing section 68 of the rotor phasing gear 62.

Each of the slots 94, 96 includes an annular sealing element 102, for example an o-ring, compressed therein. In a particular embodiment, the seal ring 92 is made of an adequate metal, for example steel, cast iron or an adequate type of super alloy, and the o-rings are made of a more flexible material, for example rubber or any adequate type of polymer such as a perfluoroelastomer (e.g. Kalrez™). The two sealing elements 102 are thus axially spaced apart and substantially radially aligned.

Each oil seal assembly 90 also includes an outer seal ring 106 protruding axially from the end face 26 and biased away from the end face by a spring member 110 received in the oil seal groove 88 axially inwardly of the outer seal ring 106. The outer seal ring 106 extends in contact with the radially outer surface 98 of the inner seal ring 92 and with the radially outer surface 112 of the oil seal groove 88. The outer seal ring 106 has an axially extending rectangular cross-section. In a particular embodiment, the inner and outer seal rings 92, 106 are made of a same material.

As such, the sealing element 102 contained in the first slot 94 is compressed between the inner and outer seal rings 92, 106 and forms a seal therebetween, while the sealing element 102 contained in the second slot 96 is compressed between the inner seal ring 92 and the radially inner surface 108 of the oil seal groove 88 and forms a seal therebetween.

In the embodiment shown, the outer seal ring 106 extends axially inwardly further than the inner seal ring 92. The oil seal groove 88 thus includes an outer section 114 and an inner section 116 separated by a shoulder 118, with the outer section 114 being defined axially deeper than the inner section 116. The outer section 114 is sized to snugly receive the outer seal ring 106 and corresponding spring member 110 therein with the outer seal ring 106 abutting the shoulder 118, and the inner section 116 is sized to snugly receive the inner seal ring 92 and corresponding spring member 104 therein.

In an alternate embodiment which is not shown, the outer seal ring 106 and corresponding spring member 110 are omitted, and the oil seal groove 88 includes a single section with the S-shaped inner seal ring 92 being received in contact with the radially inner and outer surfaces 108, 112 of the groove 88.

The two sealing elements 102 which are substantially radially aligned allows for a reduction of the radial envelope of the oil seal assembly 90 when compared to prior radially offset double seals. In a particular embodiment, the radial dimension R of the oil seal assembly 90 may be approximately 55% of the radial dimension of a typical combination of two radially spaced apart oil seals. Reduced radial dimension for the oil seals may allow for the use of a larger phasing gear or, as used with a reduced size phasing gear as shown, for a smaller rotor size for a given combustion area (however, the oil sealing described above is not a requirement for the phasing gear arrangement described). This oil seal configuration may allow for double seals to be used on smaller rotors, when compared to prior radially spaced apart double seals.

The phasing gear 62 and/or oil seal assembly 90, whether used separately or together, may also allow for the Wankel engine to have a more compact configuration and/or lower weight.

The above description is meant to be exemplary only, and one skilled in the art will recognize that changes may be made to the embodiments described without departing from the scope of the invention disclosed. For example, any suitable oil sealing arrangement may be provided. Any suitable fastener apparatus or fastening elements may be employed for connecting the phasing gear to the rotor. Modifications which fall within the scope of the present invention will be apparent to those skilled in the art, in light of a review of this disclosure, and such modifications are intended to fall within the appended claims.

The invention claimed is:

1. A rotor of a rotary internal combustion engine, the rotor comprising:
 a body having two axially spaced apart end faces and a peripheral face extending between the end faces, the peripheral face defining three circumferentially spaced apex portions, the body having a central bore defined therethrough for receiving an eccentric portion of a shaft therein, the central bore having a central axis;
 a phasing gear received in a complementary annular gear groove defined in one of the end faces around and in proximity of the central bore, the phasing gear having:
  an annular meshing section coaxial with the central bore and including a plurality of radially inwardly oriented teeth regularly distributed about a circumference thereof, and
  an annular attachment section connected to the meshing section and coaxial therewith, the attachment section being offset axially inwardly from the teeth and having at least a portion thereof located radially inwardly of the teeth;
 a plurality of circumferentially spaced fasteners connecting the phasing gear to the rotor body, the fasteners engaging the rotor body radially inwardly of the teeth such that the fasteners are radially located between the central axis and the teeth; and
 the one of the end faces including an annular seal groove defined therein outwardly of and adjacent to the gear groove, the rotor further including at least one annular oil seal received in the groove around and in contact with a radially outer surface of the meshing section.

2. The rotor as defined in claim 1, wherein the plurality of fasteners extend through the attachment section and into the rotor body.

3. The rotor as defined in claim 1, wherein the attachment section includes a first annular portion extending radially inwardly from an axially inner end of the meshing section and a second annular portion extending axially inwardly from the first annular portion.

4. The rotor as defined in claim 3, wherein the second annular portion is completely located radially inwardly of the meshing section.

5. The rotor as defined in claim 1, wherein the fasteners extend axially.

6. The rotor as defined in claim 1, wherein the fasteners are rivets.

7. The rotor as defined in claim 1, wherein an axially outer surface of the teeth is aligned with the one of the end faces.

8. A rotary internal combustion engine comprising:
a stator body having an internal cavity defined by two axially spaced apart end walls and a peripheral wall extending between the end walls, the cavity having an epitrochoid shape defining two lobes;
a rotor body having two axially spaced apart end faces each extending in proximity of a respective one of the end walls of the stator body, and a peripheral face extending between the end faces and defining three circumferentially spaced apex portions, the rotor body having a central bore defined therethrough engaged to an eccentric portion of a shaft to rotate within the cavity with each of the apex portions remaining adjacent the peripheral wall, the central bore having a central axis;
a stator phasing gear attached to the stator body and coaxial with the shaft and having a plurality of radially outwardly oriented teeth regularly distributed about a circumference thereof;
a rotor phasing gear received in a complementary annular gear groove defined in one of the end faces around and in proximity of the central bore, the rotor phasing gear having:
an annular meshing section coaxial with the central bore and including a plurality of radially inwardly oriented teeth in meshed engagement with the teeth of the stator phasing gear, and
an annular attachment section connected to the meshing section and coaxial therewith, the attachment section being offset axially inwardly from the stator phasing gear and from the teeth of the rotor phasing gear and having at least a portion thereof extending radially inwardly of the teeth;
fastening elements connecting the phasing gear to the rotor body, the fastening elements engaging the rotor body radially inwardly of the teeth of the rotor phasing gear such that the fastening elements are radially located between the central axis and the teeth rotor phasing gear;
the one of the end faces including an annular seal groove defined therein outwardly of and adjacent to the gear groove, and the rotor further including at least one annular oil seal received in the groove around and in contact with a radially outer surface of the meshing section and biased against an adjacent one of the end walls.

9. The engine as defined in claim 8, wherein the fastening elements include a plurality of fasteners extending through the attachment section and into the rotor body and being located radially inwardly of the teeth.

10. The engine as defined in claim 9, wherein the fasteners extend axially.

11. The engine as defined in claim 9, wherein the fasteners are rivets.

12. The engine as defined in claim 8, wherein the attachment section includes a first annular portion extending radially inwardly from an axially inner end of the meshing section and a second annular portion extending axially inwardly from the first annular portion.

13. The engine as defined in claim 12, wherein the second annular portion is completely located radially inwardly of the meshing section.

14. The engine as defined in claim 8, wherein an axially outer surface of the teeth of the meshing section are aligned with the one of the end faces.

15. A method of engaging a rotor of a Wankel engine within a stator body of the engine, the method comprising:
securing a first phasing gear along a first annular section of the rotor with a plurality of fasteners, the first annular section located coaxially with an eccentric portion of a rotor shaft extending through the rotor, the rotor being in contact with an annular oil seal surrounding and contacting the first phasing gear;
securing a second phasing gear to the stator body such that the second phasing gear is coaxial with the rotor shaft; and
meshing teeth of the first phasing gear with teeth of the second phasing gear, the meshed teeth being radially aligned with a second annular section of the rotor, the second annular section being defined coaxially with the first annular section and radially outwardly of the first annular section such that the first annular section and plurality of fasteners are radially located between a central axis of the rotor and the meshed teeth.

16. The method as defined in claim 15, wherein the first phasing gear is secured axially inwardly of the meshing of the first and second phasing gears.

17. The method as defined in claim 15, wherein securing the first phasing gear includes inserting the first phasing gear in a complementary groove defined in the first annular section of the rotor body.

18. The method as defined in claim 15, wherein securing the first phasing gear includes engaging the plurality of fasteners with the first phasing gear and the first annular section of the rotor body with the plurality of fasteners extending axially.

* * * * *